United States Patent [19]
Smith

[11] 3,831,208
[45] Aug. 27, 1974

[54] COMBINATION CAMPER AND BOAT

[76] Inventor: Erdis L. Smith, 110 Wesley Dr. N.W., Cedar Rapids, Iowa 52405

[22] Filed: Jan. 10, 1972

[21] Appl. No.: 216,585

[52] U.S. Cl. ............... 9/1 R, 296/23 R, 296/23 B, 296/23 F
[51] Int. Cl. ........ B63c 13/00, B60f 3/00, B60p 3/34
[58] Field of Search......... 9/1 T, 1 R, 2 R, 2 C, 2 F; 114/43.5; 115/1 R; 280/414 R, 414 A, 414 B, 36 R; 296/1 R, 23 R, 23 C, 23 E, 23 F, 23 G, 13, 27, 137 R, 137 B, 137 F, 137 G

[56] References Cited
UNITED STATES PATENTS

| | | | |
|---|---|---|---|
| 2,582,635 | 1/1952 | Kipple | 9/1 T |
| 2,920,919 | 1/1960 | Spencer | 296/23 F |
| 3,121,238 | 2/1964 | Levinson | 9/1 T |
| 3,320,698 | 5/1967 | Hummel | 9/1 R X |
| 3,376,586 | 4/1968 | Forsyth et al. | 9/1 R |
| 3,596,416 | 8/1971 | Hojka | 296/23 C |
| 3,662,412 | 5/1972 | Hawkins | 9/1 R |

*Primary Examiner*—Milton Buchler
*Assistant Examiner*—Barry L. Kelmachter
*Attorney, Agent, or Firm*—James C. Nemmers

[57] ABSTRACT

A compact self-contained unit which can be towed over the road and used as either a boat or a camper, the unit having complete living facilities. The unit has a hard top that can be raised to increase the head room when the unit is used either as a boat or as a camper, or the unit can be used with the top lowered as it normally is during transportation.

6 Claims, 6 Drawing Figures

COMBINATION CAMPER AND BOAT

BACKGROUND OF THE INVENTION

The invention relates to a portable recreational vehicle of a type which contains complete living facilities but which is also usable as a recreational water craft, merely by removing the unit from its trailer.

The market for leisure time and recreational type vehicles has expanded greatly during recent years. There are, therefore, commercially available many different types of transportable units containing living facilities of varying degrees. Most of these units are designed to be easily transportable and are, therefore, mounted on a chassis containing ground wheels or are adapted for placement into the box of a pickup truck. Most of the camper type vehicles contain only limited living facilities, but the more deluxe units contain complete living quarters. Units of the latter type are really small mobile homes and can be used for extended periods of living. There are also commercially available a wide variety of power boats and luxury cruisers, the latter usually containing complete living facilities but not designed for use except on the water. This invention relates to a type of recreational unit which is generally used for shorter periods of time such as weekend camping trips or camping type vacations. Many people who purchase and use campers, as they are commonly called, will find themselves camping on or near a body of water. The prior art discloses some designs of campers which can also be used as boats, but these are difficult to convert from a camper to a water craft, and when converted provide a water craft that lacks the charactertisics of a crusier type boat. As an example, the combination camper and boat shown in U.S. Pst. No. 3,522,967 must be inverted from its position as a pick up camper when it is used as a boat, thus creating problems with respect to the interior living facilities. Also, this unit would be very difficult to launch since it must be removed from the bed of a pickup truck, inverted and placed in the water.

On the other hand, the cruiser type power boats are not generally suitable for overnight camping trips, and because of their size and profile are not easily transportable from site to site. Such units are designed to be placed in the water and kept there between uses. To my knowledge, the prior art does not disclose a combination camper boat which requires no modification when used as a camper or as a boat, which is easily transportable, quickly and simply, launched and which when used in the water provides a craft that is comparable to a power boat in practically all respects.

SUMMARY OF THE INVENTION

The present invention provides a unique portable recreational unit with complete living facilities which can be used as a camper and which can be readily converted to a power boat by merely launching the camper into the water from its trailer. The unit is designed so that when being transported it has a profile that provides a streamlined vehicle with minimum wind resistance, but when used either as a camper or as a boat, has ample head room to permit an adult to stand fully erect. To accomplish this, the unit has a top that can be raised or lowered, when used either as a camper or as a water craft. When the top is in the raised position, the unit has maximum head room, but can be operated with the top in the lowered position during inclement weather or for security reasons. The top is preferably power operated and is pivotally mounted near the front of the unit in a unique manner so as to provide both a streamlined design and a design with maximum interior space. The interior of the unit can be arranged in any desired manner to provide a low cost unit with minimal living facilities, or the unit can be made a luxury unit by providing it with complete living facilities if desired.

DESCRIPTION OF THE PREFERRED EMBODIMENT OF THE INVENTION

Figure 1:
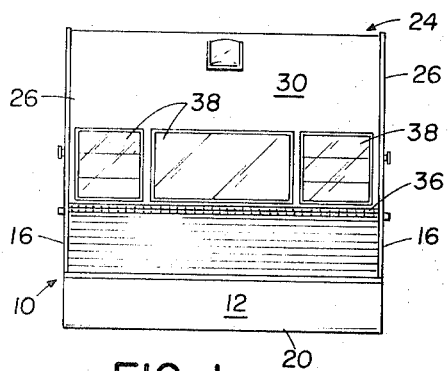
FIG. 1 is a front elevational view of my combination camper boat constructed according to the principles of my invention and showing the top in a fully raised position.

The portable recreational unit of the invention has a lower portion or hull 10 which includes a front wall 12 and a rear wall 14 which walls are joined by two side walls 16. The hull 10 is completed by a bottom wall 20 which joins the front wall 12, the rear wall 14 and side walls 16. The various walls are joined so as to be watertight and may, if desired, be made of a one piece construction. The lower portion of the front wall 12 where it joins the bottom wall 20 is preferably curved as shown in FIG. 2 so as to minimize the water resistance when the unit is used as a water craft.

Figure 2:
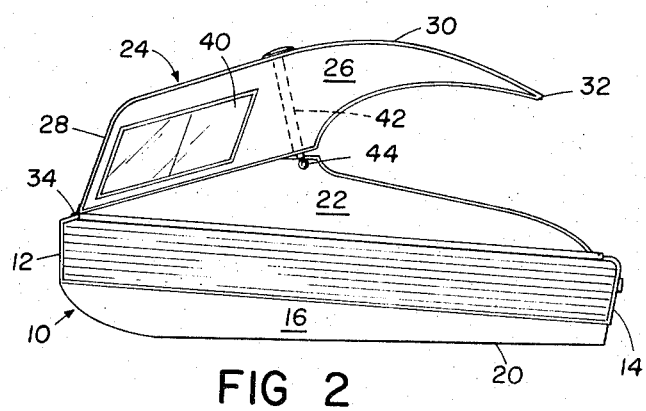
FIG. 2 is a side elevational view of the unit of FIG. 1 and also showing the top in a fully raised position.
Figure 3:
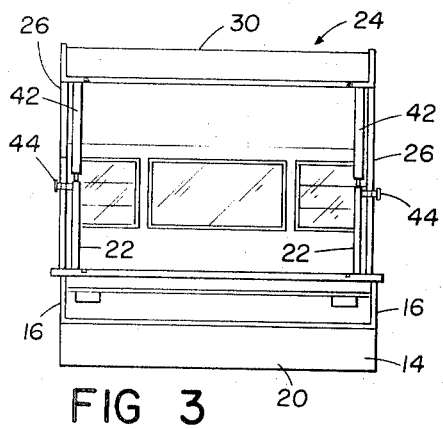
FIG. 3 is a rear elevational view of the unit of FIGS. 1 and 2 and showing the top in a fully raised position but not showing any of the interior living facilities.
Figure 4:
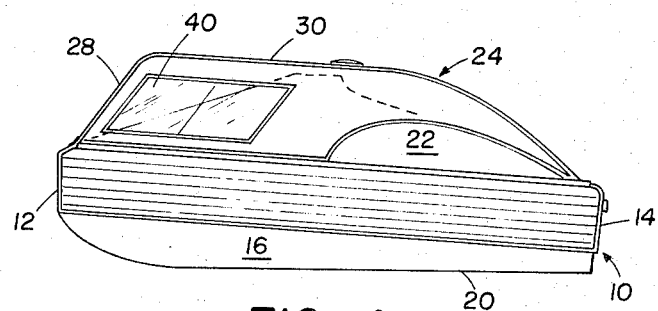
FIG. 4 is a side elevational view similar to FIG. 2 but showing the top in a lowered or closed position.

Each of the side walls 16 preferably extend vertically upwardly to join side panels 22 which extend from near the rear wall 14 to the front wall 12, in the configuration best seen in FIG. 2. As seen in FIG. 2, the upper edge of each side panel extends upwardly along a curved path from a point near the rear wall 14 to a point near the center of the unit and then extends downwardly in a straight line terminating at a point on the upper edge of the side wall 16 near the front wall 12. As best seen in FIG. 3, each of the side panels 22 positioned in a plane inwardly of its respective side wall 16.

A movable top 24 is pivotally mounted on hull 10 and includes side panels 26 which are joined along their front edges by a front wall 28 and by a top wall 30. The rearmost portion of the lower edge of each side panel 26 is curved upwardly and the top wall 30 is curved downwardly so that they terminate at a juncture 32. The juncture of the lower edges of side panels 26 with front wall 28 defines a pivot point 34 for the pivot mounting of the top 24 on hull 10 near the front wall 12. The pivot mounting of top 24 on hull 10 is preferably by a continuous piano type hinge 36 (FIG. 1) which may be covered by a flexible material (not shown)

which will seal the pivot mounting of the top 24 and the hull 10. The top 24 is preferably provided with front windows 38 and side windows 40 as shown. Preferably, there is also provided a means to seal the juncture 32 of top 24 with the rear wall 14 of the hull 10 when the top 24 is lowered. This may be accomplished in any number of ways as will be obvious to those skilled in the art and, therefore, no particular sealing means has been shown.

The pivotally mounted top 24 can be raised and lowered manually, electrically, or by means of an air operated or hydraulic cylinder, such as cylinders 42 (FIG. 3). As best seen in FIG. 3, the side panels 26 of the pivotally mounted top 24 are positioned outwardly of the side panels 22 of the hull 10. One of the hydraulic cylinders 42 is mounted on the highest portion of the upper edge of each side panel 22 and extends upwardly and is secured to the underside of top wall 30 of the pivotally mounted top 24. The camper-boat unit is preferably provided with a storage battery (not shown) which can be utilized to electrically power a hydraulic motor (not shown) that will control the fluid flow to and from hydraulic cylinders 42 and thus allow the top 24 to be raised and lowered with ease. It will be understood that instead of the hydraulic cylinders 42 electrically powered motors and winches, or air operated cylinders, (if air pressure were available) or other suitable power means could be employed. If the top 24 is manually raised and lowered there would preferably be provided suitable catches or stops 44 to hold the top in its raised position. These catches 44 could also be provided as a safety feature even though the top is raised and lowered electrically, hydraulically, etc. When used either as a camper or as a boat the unit can be operated with the top raised or lowered, the latter being preferred for security reasons or during inclement weather. With the top lowered, the occupants will have to remain in a seated or stooped position. However, normally, the unit will be operated with the top raised thus providing ample head room without stooping or sitting.

The angle of the front wall 12 to the vertical is preferably between 30 and 40 so as to provide a streamlined effect and minimize air resistance when the unit is being towed over the road. The angle of front wall 12 is also to provide a maximum of head room when the top is raised. As the length of the unit is increased, this head room would be correspondingly increased due to the design of the top.

Figure 5:
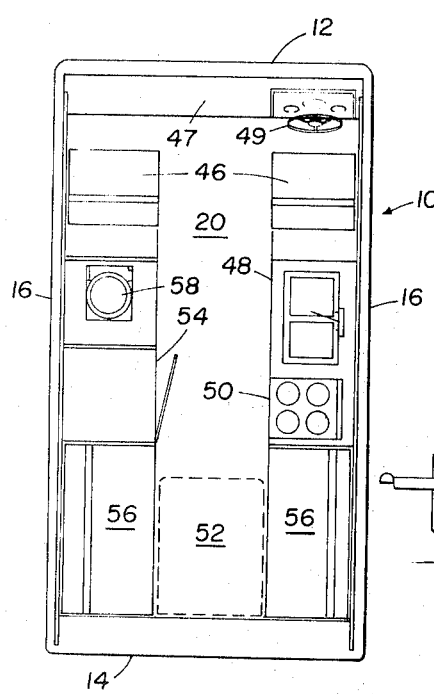
FIG. 5 is a top plan view of the unit with the top removed to show the interior of the unit.

In FIG. 5, there is shown for purpose of illustration one possible arrangement for living facilities which would normally be found in the luxury type units. In such units, there is provision near the front wall 12 for two seats 46 which are primarily used while the unit is being operated on the water. Forwardly of the seats 46 is a control or instrument panel 47 and steering wheel 49. Kitchen facilities include a sink 48, cooking range 50, a refrigerator 54, and room for a folding table 52. Around the table 52 are bench type seats 56 for four adults. Seats 56 are convertible into beds. There may also be provided space for a chemical toilet 58.

When used as a boat, the unit can be powered either by an outboard engine (not shown) affixed to the rear wall 14 or by an inboard engine. If an inboard engine is used, the rear portion of hull 10 preferably is extended to provide room at the rear of the unit for the engine, gas tank, etc. Of course, the boat-camper unit could also be provided with a full lighting system adequate for highway travel as well as travel on the water. If desired as an optional accessory, the open area between the top 24 and the hull 10 may be covered by a canvas or other suitable means when the top is raised.

In order to transport the unit, it is mounted on a suitable trailer 60 capable of being towed by means of connection to the trailer hitch of an automobile, truck, etc. The trailer 60 is of a type designed to conform to the hull 10 of the unit and would contain rails and/or rollers (not shown) and a winch to permit easy launching of the unit into the water and subsequent retrieval by use of the winch. This trailer 60 has been shown in connection with only the unit of FIG. 6 but obviously a trailer would also be provided with the unit of FIGS. 1 – 5. The specific details of the trailer 60 have not been shown since they would depend on the type of boat-camper unit, and the specific design, once the hull 10 had been designed, would be within the scope of a person ordinarily skilled in the art.

Figure 6:
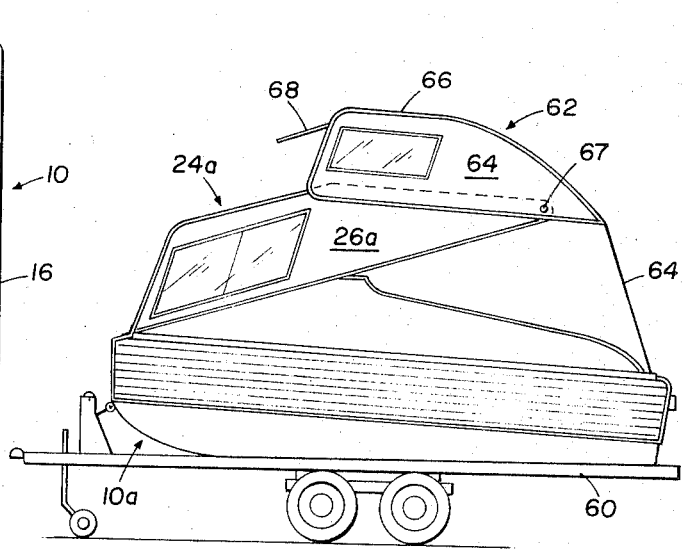
FIG. 6 is a side elevational view similar to FIG. 4 but showing the unit on its trailer and illustrating another embodiment of the invention which includes a modified top construction.

In FIG. 6 there is shown a second embodiment of the unit in which a modified arrangement for the movable top is shown. Parts of the second embodiment corresponding to those of the embodiment of FIGS. 1 – 4 will be referred to by the same reference numeral followed by the letter "a." The boat-camper unit of FIG. 6 includes a hull 10a substantially identical to the hull 10 of the first embodiment. The top 24a, however, has side panels 26a of a slightly different configuration than the side panels of the first embodiment. The upper and lower edges of side panels 26a are straight rather than curved as they are on side panels 26. Side panels 26a are adapted at their rearmost point for the pivotal mounting of a secondary top 62 which has side walls 64 joined by a top 66. The secondary top 62 is pivotally mounted at pivot 67 which is rearwardly of the center point of top 62 and at the rear of top 24a. In FIG. 6, the top is shown in a raised position, the top being raised by any suitable means as previously described with reference to the first embodiment. However, the rear of the secondary top 62 would be connected by a flexible member 64 of predetermined length to the hull 10a. Thus, as the top 24a is raised, the secondary top 62 will pivot with respect to the top 24a until it reaches the position shown in FIG. 6 which is the fully raised position. If desired, a suitable catch or safety stop (not shown) could be provided between the secondary top 62 and the first top 24a in order to maintain them in the relative position shown in FIG. 6. When the top is lowered, the safety catch or stop would be released and as the top 24a is lowered, the secondary top 62 would return to a position in which the lower edges of the side walls 64 would coincide with the lower edges of the side panels 26a. If desired, the secondary top 62 is provided with a front wall or windshield 68 which is pivotally mounted at it upper edge to allow the secondary top 62 to be lowered. With this second embodiment, it is obvious that additional head room will be created, particularly in the rear portion of the unit. With either embodiment, however, it will be understood that the head room will be adequate for an average adult to stand fully erect almost anyplace in the unit when the top is raised. Even in the foremost portion of the boat or camper, an adult can stand almost fully erect.

It is obvious from the design of my unit that the top lowered, highway travel is facilitated because the unit will be of a low profile providing a streamlined vehicle with a minimum of wind resistance and very little vacuum pull at the rear of the unit, due to the swept back profile of the top. It will be further obvious that the basic unit shown and described herein can be provided with many additional accessory items, such as a horn, windshield wipers, running lights for operation of the unit as a boat at night, hand rails to facilitate getting into and out of the unit when used as a boat, etc. It will be further obvious to those skilled in the art that various revisions and modifications can be made in the embodiments described herein without departing from the spirit and scope of the invention. It is my intention, however, that all such revisions and modifications as are obvious to those skilled in the art will be included within the scope of the following claims.

I claim:

1. For use with a towable trailer, a transportable recreational unit for use as either a boat or a camper, said unit comprising a watertight base portion formed as a boat hull for use on water, said hull including front and rear walls fixedly interconnected by spaced apart side walls so as to form a rigid one-piece watertight hull, a top movable upwardly and downwardly and having spaced apart side walls joined by a top wall and a front wall to form a rigid one-piece top, the forward part of said top wall being somewhat flat and the rear part of said top wall curving downwardly toward said hull so as to completely enclose said hull when said top is in its lowest position, said movable top being pivotally mounted on a fixed axis along the lower edge of its front wall on said hull closely adjacent to the upper edge of the front wall of the hull so that the rear of said top can be raised and lowered relative to the hull thereby to increase the head room in said unit, means to maintain the rear of said top in a raised position at selected times, and means to power said unit when in the water.

2. The transportable recreational unit of claim 1 in which each side wall of said movable top is substantially parallel to a respective side wall of said hull, and the side walls of said top are positioned outwardly from the side walls of said hull.

3. The transportable recreational unit of claim 1 in which the front wall of said movable top slants rearwardly at an angle to the vertical of between 30° and 40° when said top is in its lowest position.

4. The transportable recreational unit of claim 1 in which the interior of said hull is provided with facilities for overnight camping.

5. The transportable recreational unit of claim 1 in which the upper portions of the side walls of said hull are offset inwardly to form side panels, and the side walls of said top are generally in the same planes as the respective side walls of the hull and therefore outwardly of said side panels.

6. The transportable recreational unit of claim 5 in which there is provided power-operated extensible means between the upper edge of a side panel and the top wall of said movable top, said means being operable to raise and lower said top.

* * * * *